(No Model.)
S. JENNINGS & J. MORLEY.
WATER CLOSET.
No. 482,923.　　　　　　　　Patented Sept. 20, 1892.
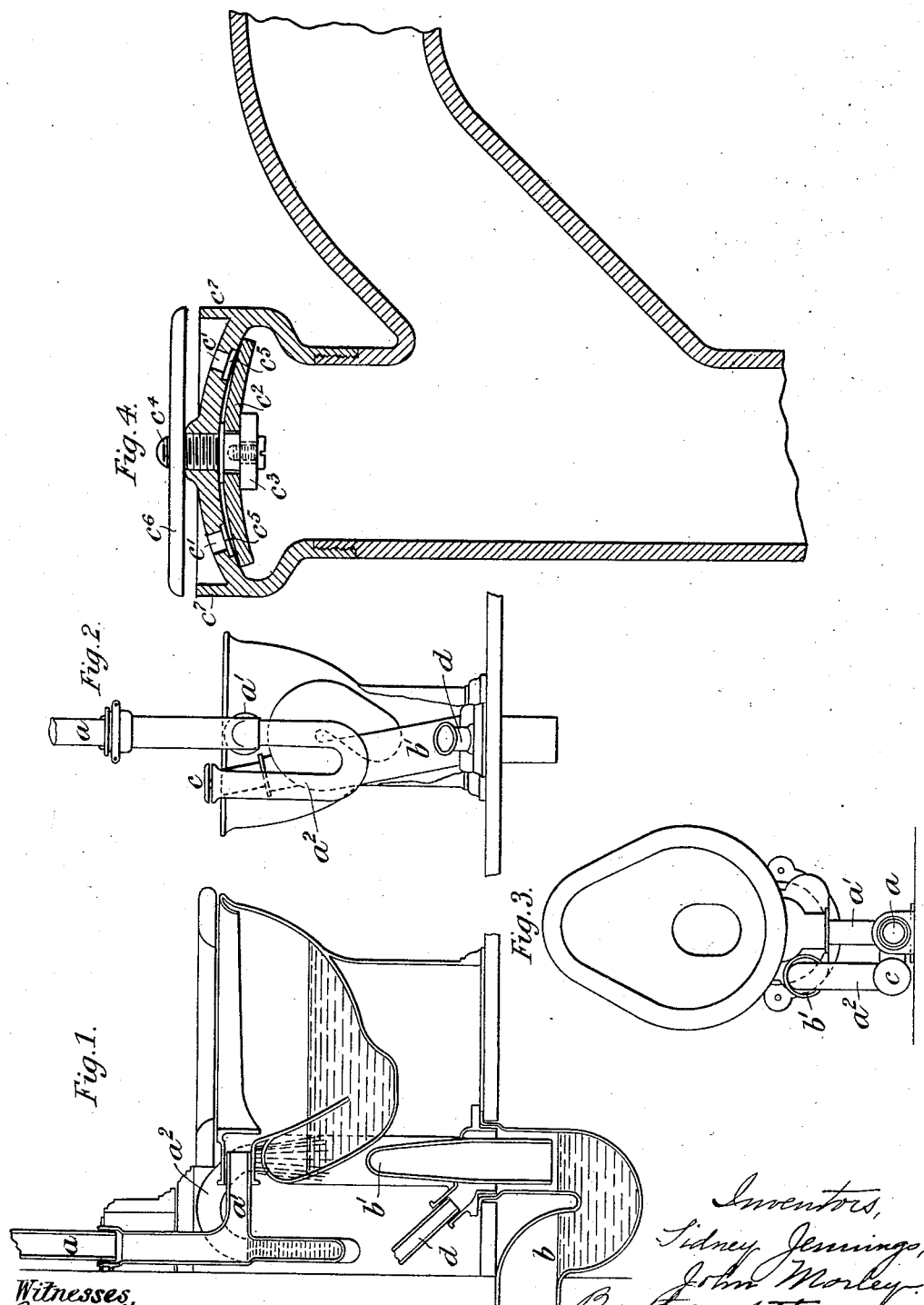

United States Patent Office.

SIDNEY JENNINGS AND JOHN MORLEY, OF LAMBETH, ENGLAND.

WATER-CLOSET.

SPECIFICATION forming part of Letters Patent No. 482,923, dated September 20, 1892.

Application filed June 8, 1892. Serial No. 435,968. (No model.)

*To all whom it may concern:*

Be it known that we, SIDNEY JENNINGS and JOHN MORLEY, sanitary engineers, subjects of the Queen of Great Britain, residing at Palace Wharf, Stangate, Lambeth, in the county of Surrey, England, have invented certain new and useful Improvements in Water-Closets, of which the following is a specification.

This invention relates to water-closets which are emptied by siphoning. In such closets inconvenience is caused by the pouring of slops into the pan, starting siphonic action, leaving the pan empty and trap unsealed if the handle is not pulled to admit fresh water. To obviate this objection, we adopt the arrangement shown in the drawings.

Figure 1 is a longitudinal vertical section; Fig. 2, a back elevation, and Fig. 3 a plan. Fig. 4 shows the details of the air-valve on a larger scale.

The supply-pipe $a$ from the water-waste preventer or other source is branched at the bottom, one branch $a$ leading into the pan in the ordinary manner, while the other branch $a^2$ is led first downward, then upward, and again downward into the top of the long leg $b'$ of the siphon-pipe $b$ from the pan. At the top bend of the water-pipe $a^2$ is fixed a valve $c$, opening inward. If slops are poured into the pan, this valve admits air and prevents any siphonic action being set up; but when the handle is pulled the flow of water down the pipe $a$ is divided, part passing by the pipe $a'$ and flushing the pan in the ordinary manner, while part rushes along the pipe $a^2$ past the air-valve $c$, and holds it closed, so that no air can enter. This water also in flowing down the long leg $b'$ of the siphon starts the siphonic action and empties the pan, which is afterward filled with clean water by the usual after-flush apparatus.

Fig. 4 is a section of the air-valve $c$. The top of its case is provided with a ring of holes $c'$ for the admission of the air. $c^2$ is a disk of india-rubber held loosely at its middle by a nut $c^3$ on a spindle $c^4$. The holes $c'$ are formed at the bottom of a groove $c^5$, so that the india-rubber does not come against the bottom of the holes, and any permanent deformation, therefore, of it by the pressure is round a complete ring instead of only at the holes, as would otherwise be the case. The rubber thus always makes a tight joint against its seat, although it is free to turn upon the spindle $c^4$. $c^6$ is a cap on the spindle $c^4$, which hides the holes and prevents any water escaping from them from splashing. Such water collects round the rim $c^7$ and flows back. In cases where it is preferred to trap the long leg of the siphon we provide a special connection for an air-pipe $d$, leading into the open air from the trap, as without this the siphonic action would not take place.

What we claim is—

1. In water-closets, the combination of a pan, a siphon-pipe leading from the pan, a water-supply pipe with two branches, one to the pan and the other to the long leg of the siphon, and an air-inlet valve in the upper part of the latter branch.

2. In water-closets, the combination of a pan, a siphon-pipe leading from the pan, a trap at the bottom of the long leg of the siphon, a water-supply pipe with two branches, one to the pan and the other to the long leg of the siphon, an air-inlet valve in the upper part of the latter branch, and an opening from the air into the lower end of the long leg of the siphon.

SIDNEY JENNINGS.
JOHN MORLEY.

Witnesses:
 GEO. WILLIAM BARNARD,
*Solicitor, Lambeth, a Commissioner to Administer Oaths.*
 CHAS. ROCHE,
*Clerk to John Venn, Notary, 8 St. Martin's Place, Trafalgar Square, London.*